United States Patent [19]
Li

[11] Patent Number: 5,710,632
[45] Date of Patent: Jan. 20, 1998

[54] METHODOLOGY FOR THE DETERMINATION OF THE MINIMUM AND GAP FLYING HEIGHT OF A THIN-FILM SLIDER

[75] Inventor: Yufeng Li, Fremont, Calif.

[73] Assignee: Samsung Electronics, Inc., Rep. of Korea

[21] Appl. No.: 692,529

[22] Filed: Aug. 6, 1996

[51] Int. Cl.$^6$ ........................................... G01B 9/02
[52] U.S. Cl. ........................... 356/357; 356/361; 356/359
[58] Field of Search .................................. 356/351, 352, 356/356, 357, 361

[56] References Cited

U.S. PATENT DOCUMENTS

| | | |
|---|---|---|
| 5,475,488 | 12/1995 | Fukuzawa et al. ...................... 356/357 |
| 5,557,399 | 9/1996 | De Groot ................................ 356/357 |

Primary Examiner—Frank G. Font
Assistant Examiner—Robert Kim
Attorney, Agent, or Firm—Blakely Sokoloff Taylor & Zafman

[57] ABSTRACT

A method and apparatus for measuring the flying height of a recording head that is separated from a rotating disk by an air bearing. The recording head has a trailing edge that extends from an interface of a substrate. The trailing edge has an embedded read/write element and an outer tip. The recording head is loaded into a flying height tester that can measure the distance between the disk and any point on the head. The flying height tester contains a transparent disk that is rotated to create an air bearing between the head and the disk. The outer tip is separated from the disk by an air bearing height $h_m$. The read/write element is separated from the disk by an air bearing height $h_g$. The substrate interface is separated from the disk by an air bearing height $h_i$. The flying height tester measures the height $h_g$ to obtain the distance between the read/write element and the disk.

20 Claims, 4 Drawing Sheets

METHODOLOGY FOR THE DETERMINATION OF THE MINIMUM AND GAP FLYING HEIGHT OF A THIN-FILM SLIDER

BACKGROUND OF THE INVENTION

1. Field of the Invention

The present invention relates to a method and apparatus for measuring and verifying air bearing heights of a recording head for a hard disk drive.

2. Description of Related Art

Hard disk drives contain magnetic transducers that magnetize and sense the magnetic field of a rotating disk. The magnetic transducers are integrated into sliders which have hydrodynamic features that create an air bearing between the transducers and the disk. The air bearing prevents mechanical wear between the disk and the sliders. It is desirable to minimize the height of the air bearing to optimize the sensitivity of the transducer. When manufacturing hard disk drives the sliders are typically tested on a flying height tester to insure that the air bearing height is within allowable design specifications.

Flying height testers typically have a loader which places the slider adjacent to a transparent disk. The transparent disk is rotated to create an air bearing between the slider and the disk. A light beam is directed through the disk and reflected from the slider/disk interface. The reflected light creates an interference pattern that is detected by a photodetector. The interference pattern is analyzed by a computer to determine the flying height of the slider.

FIG. 1 shows a recording head slider 1 that is separated from a rotating disk 2 by an air bearing 3. The recording head 1 has a read/write element 4 that is embedded into a trailing edge 5 of the slider 1. The trailing edge 5 extends from a substrate 6 that is typically constructed from $Al_2O_3$—TiC. The read/write element 4 is typically covered with a layer of $Al_2O_3$ that is lapped down to the edge of the element 4. The lapping process may create a recess 7 between the substrate 6 and the trailing edge 5.

Flying height testers typically measure an air bearing height $h_L$ at the leading edge of the slider 1 and an air bearing height $h_t$ toward the interface of the substrate 6 and the trailing edge 5. $H_L$ and $h_t$ are used to calculate the pitch $\alpha$ of the slider 1. The flying height tester also provides the value of $h_t$ which is used to assess head/disk interface reliability and durability.

To more accurately analyze the head/disk interface it would be desirable to measure the flying height $h_g$ between the read/write element and the disk, and the minimum flying height between the slider 1 and the disk 2. The minimum flying height may be the height $h_i$ between the disk and the substrate interface, or the height $h_m$ between the disk and the tip of the trailing edge. The minimum height is useful to assess the reliability and durability of the head/disk interface. The gap flying height $h_g$ can be used to analyze the performance of the read/write element. It would be desirable to provide a method and apparatus that measures the minimum flying height, and the gap flying height $h_g$ between the read/write element and the disk. It would also be desirable to verify the accuracy of the flying height measurements.

SUMMARY OF THE INVENTION

The present invention is a method and apparatus for measuring the flying height of a recording head that is separated from a rotating disk by an air bearing. The recording head has a trailing edge that extends from an interface of a substrate. The trailing edge has an embedded read/write element and an outer tip. The recording head is loaded into a flying height tester that can measure the distance between the disk and any point on the head. The flying height tester contains a transparent disk that is rotated to create an air bearing between the head and the disk. The outer tip is separated from the disk by an air bearing height $h_m$. The read/write element is separated from the disk by an air bearing height $h_g$. The substrate interface is separated from the disk by an air bearing height $h_i$. The flying height tester measures the height $h_g$ to obtain the distance between the read/write element and the disk. The tester also measures the heights $h_i$ to $h_m$ to determine the minimum height of the air bearing. The index of refraction n and extinction coefficient k of the substrate and the trailing edge can be initially measured with an ellipsometer and used by the flying height tester to compute the air bearing heights $h_g$, $h_i$ and $h_m$. Additionally, the profile of the slider can be measured and used to verify the accuracy of the flying height measurements.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
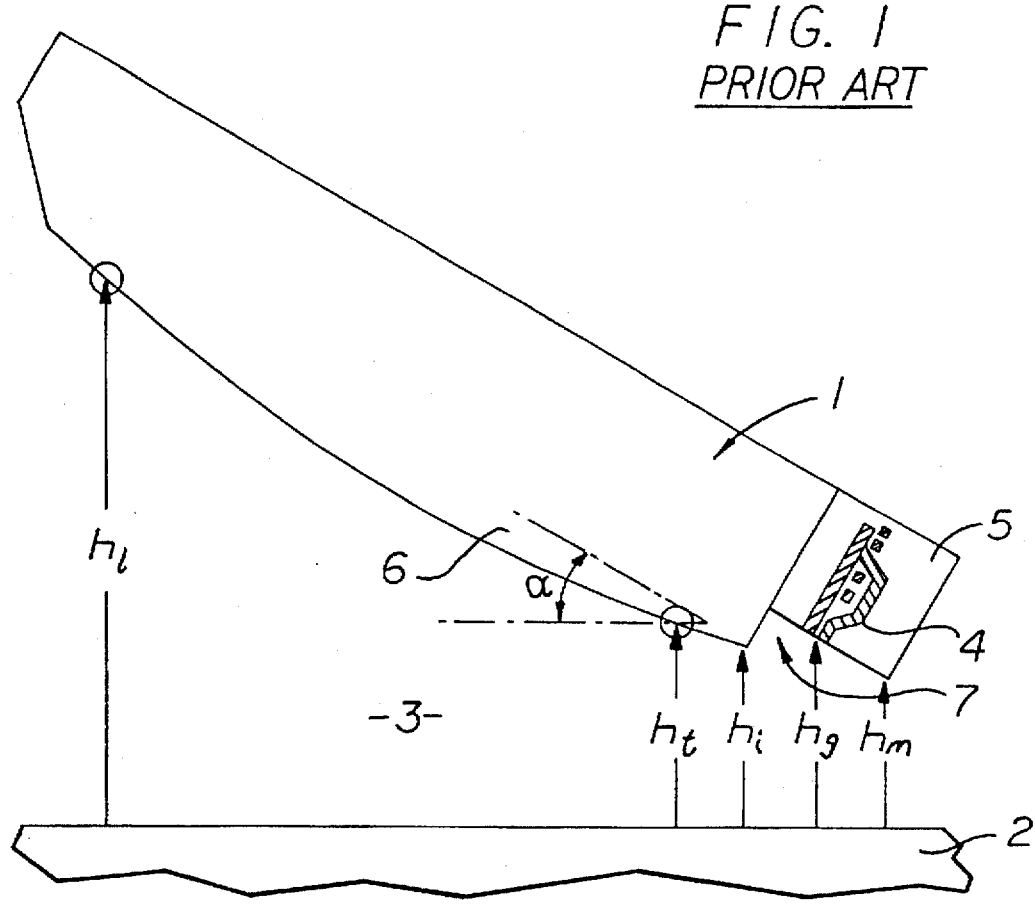
FIG. 1 is a schematic showing a recording head separated from a disk by an air bearing.
Figure 2:
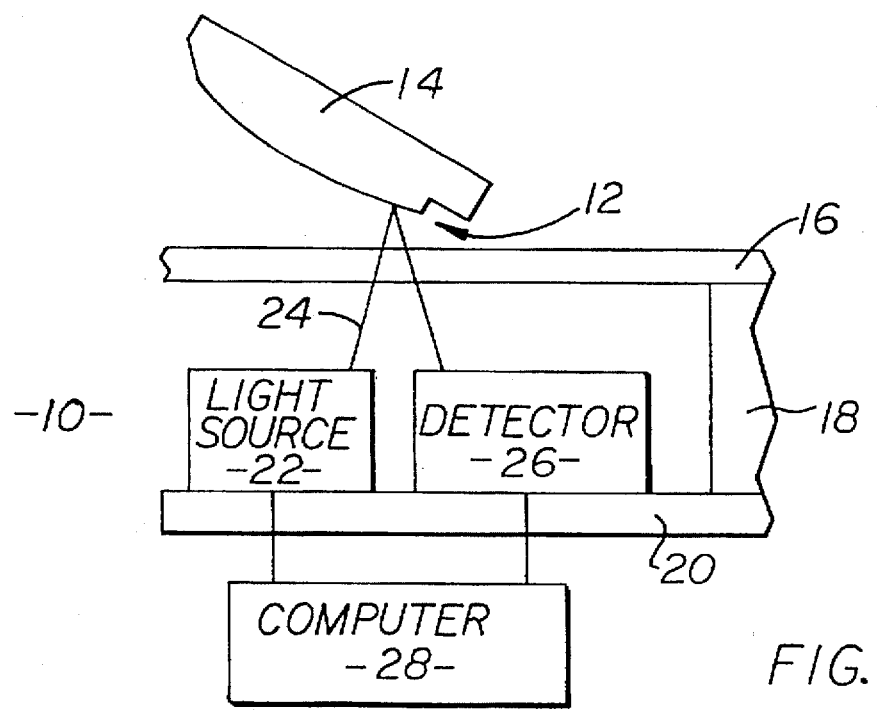
FIG. 2 is a schematic of a flying height tester that measures the height of an air bearing.

Referring to the drawings more particularly by reference numbers, FIG. 2 shows a tester 10 that measures the height of an air bearing 12 that separates a recording head 14 from a disk 16. The disk 16 is transparent and mounted to a spindle 18 that is attached to an x-y table 20. Also mounted to the x-y table 20 is a light source 22 which can direct a light beam 24 through the disk 16 and onto the head 14. The x-y table 20 can move the light source 22 so that the light beam 24 is reflected off of different locations on the head 14.

The light beam 24 reflects off of the head/disk interface and back through the disk 16. The reflected light beam creates an interference pattern that is detected by a photodetector 26. The photodetector 26 is coupled to a computer 28 which can analyze the interference pattern to determine the height of the air bearing. The light source 22, disk 16, x-y table 20, photodetector 26 and computer 28 may be a flying height tester sold by Phase Metrics of San Diego, Calif.

Figure 3:
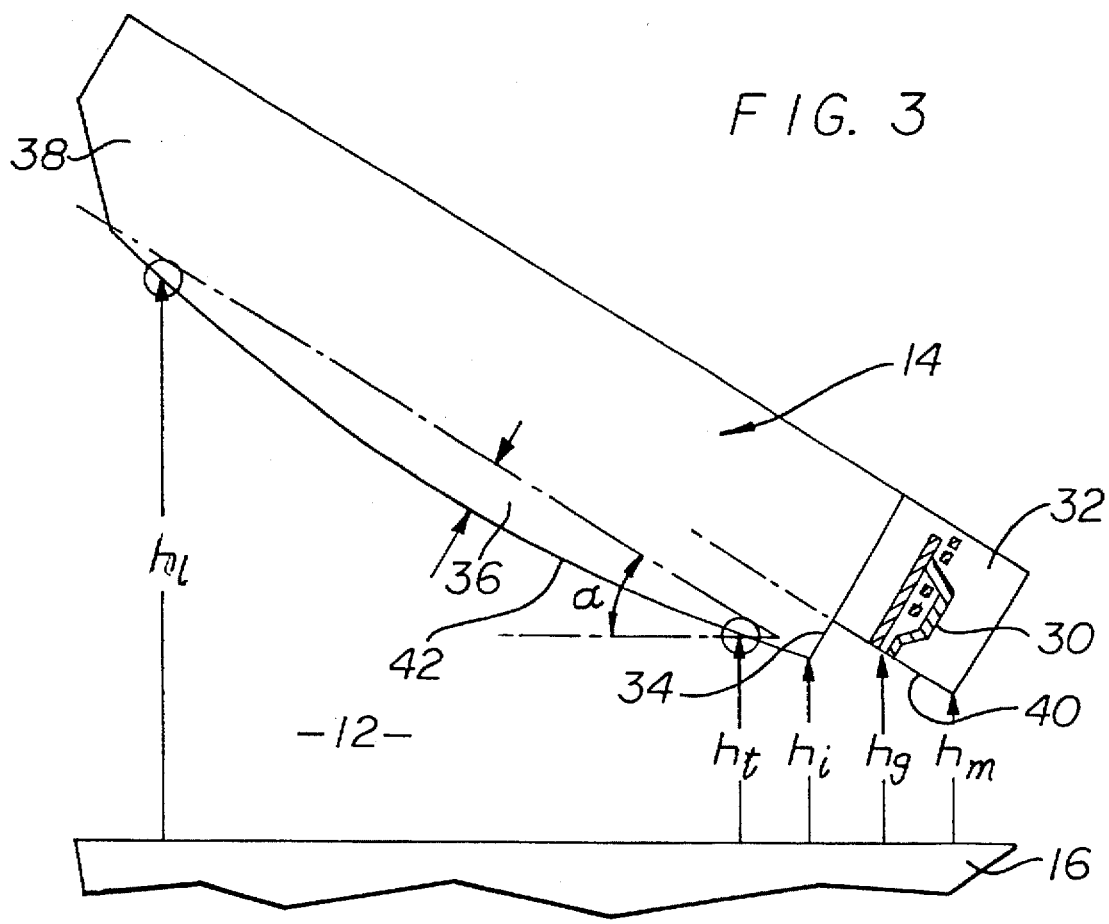
FIG. 3 is a schematic showing the recording head flying above a rotating disk.

As shown in FIG. 3, the recording head 14 has a read/write element 30 embedded into a trailing edge 32. The trailing edge 32 extends from an interface 34 of a substrate 36 which has a leading edge 38. The trailing edge 32 has an air bearing surface 40 that is typically recessed from an air bearing surface 42 of the substrate 36. When flying above the transparent disk 16 the interface 34 is separated from the disk 16 by an air bearing height $h_i$. The read/write element 30 is separated from the disk 16 by an air bearing height $h_g$. The tip of the trailing edge 32 is separated from the disk 16 by an air bearing height $h_m$.

The substrate 36 is typically constructed from $Al_2O_3$—TiC. The trailing edge 32 typically contains $Al_2O_3$ which has an index of refraction n and an extinction coefficient k that are different than the n and k values of the substrate 36. The flying height tester computes the air bearing height using defined n and k values. To improve the accuracy of the tester 10 it is desirable to measure the actual n and k values of the head 14. The actual n and k values can be measured with an ellipsometer (not shown). An ellipsometer computes the n and k values using a polarized light beam that is reflected off of the recording head 14.

Figure 4:
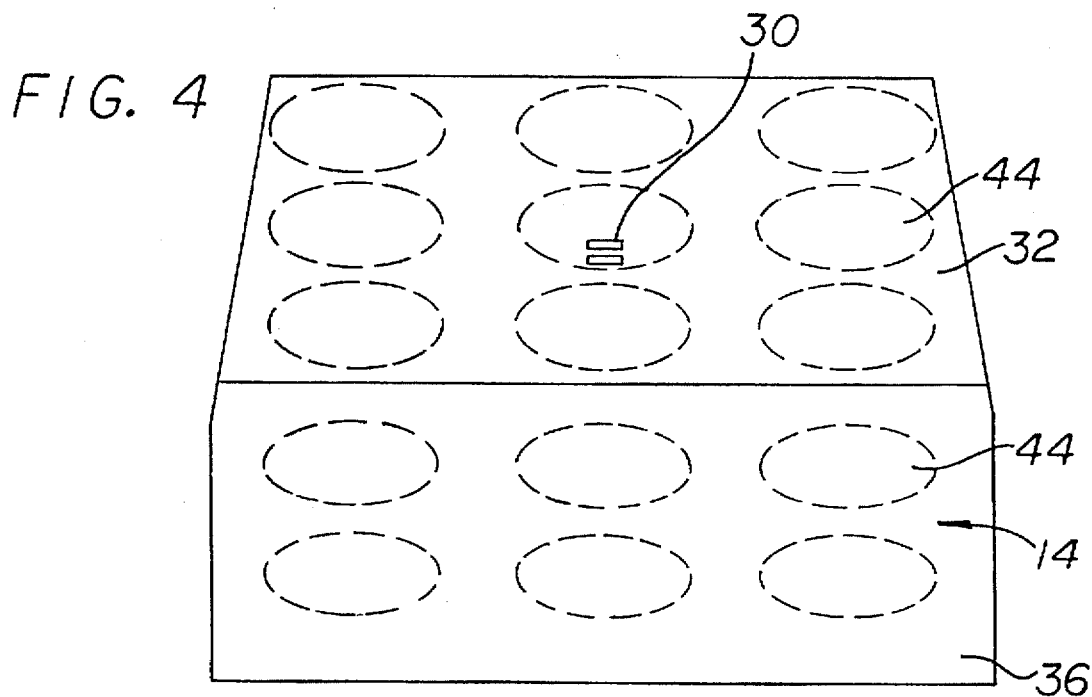
FIG. 4 is a schematic showing beam locations of an ellipsometer that measures the n and k values of the recording head.

As shown in FIG. 4, the light beam 44 of the ellipsometer is preferably directed onto 6 different locations of the substrate 36 and 9 different locations of the trailing edge 32 to provide 15 separate n and k measurements. The n and k measurements of the substrate 36 are averaged to provide a single average value for n and a single average value for k.

The $Al_2O_3$ material of the trailing edge 32 is translucent. The read/write element 30 is constructed from opaque material such as copper. The effective n and k values of the trailing edge 32 above the read/write element may be different than the n and k values in the remaining portion of the trailing edge 32. The ellipsometer can provide separate n and k values for each location of the trailing edge 32 to compensate for the variations in the optical properties of the edge portion. The diameter of the light beam 44 should be small enough to measure 15 different locations on the head 14. For a head that has a width of 50 um, the beam 44 may have a diameter of 10 um. The wavelengths of the ellipsometer light source should be the same as the wavelengths of the flying height tester. Separate n and k values can be measured for each wavelength of light.

The n and k values can be computed from the ellipsometric variables $\Psi$ and $\Delta$. The variable $\Delta$ for translucent materials such as $Al_2O_3$ is close to zero. A relatively small $\Delta$ value will reduce the accuracy of the extinction coefficient k. It is desirable to obtain a $\Delta$ value that is near 90°. A retarder can be placed within the ellipsometer to shift the $\Delta$ value toward 90° to increase the accuracy of the k value and the flying height tester.

The measured n and k values are provided to the flying height tester 10 to compute the various heights of the air bearing 12. Referring to FIG. 3, the x-y table 20 moves the light source 22 so that the light beam 24 is reflected off of the read/write portion of the head 14 to measure the air bearing height $h_r$ using the appropriate n and k values of the trailing edge. The x-y table 20 then moves the light source 22 to reflect the light beam 24 off the substrate interface 34 to measure the air bearing height $h_i$ using the n and k values of the substrate 36. The x-y table 20 can then move the light source 22 to measure the air bearing height $h_m$ using the appropriate trailing edge n and k values. Because the tester is measuring an average of the slider under the light beam, the beam used to measure the heights $h_i$ and $h_m$ should be kept relatively small, typically in the range of 10 um so that the beam only covers the edges of the interface 34 and tip.

The heights $h_i$ and $h_m$ can be compared to determine the true minimum height of the air bearing. The height $h_g$ provides a measurement of the distance between read/write element 30 and the disk 16, which can be used to analyze the performance of the transducer 30.

The portion of the head 14 which contains the read/write element 30 may have different n and k values than the remaining portions of the trailing edge 32. To minimize the varying n and k values the light beam 24 may have a spot area that is at least 20 times greater than the area of the read/write element 30. It has been found that the read/write element 30 can cause an undesirable frequency modulation during intensity calibration if a smaller beam is used by the tester.

Figure 5:
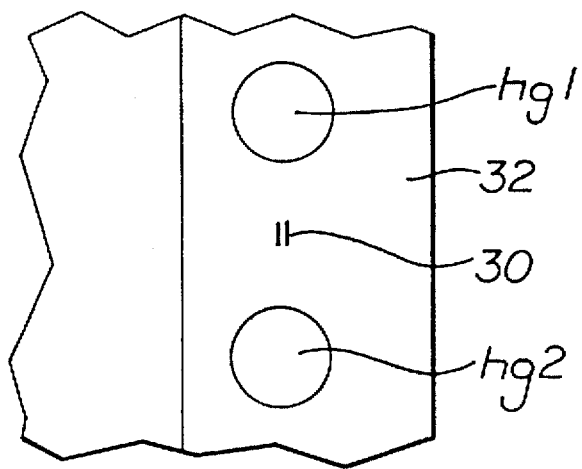
FIG. 5 is a schematic showing beam locations of the flying height tester on the trailing edge of the recording head.

Alternatively, as shown in FIG. 5, two separate measurements $h_g1$ and $h_g2$ can be taken at opposite sides of the read/write element 30 in areas that have the same n and k values. The average of $h_g1$ and $h_g2$ can be used as the flying gap height $h_g$.

Figure 6:
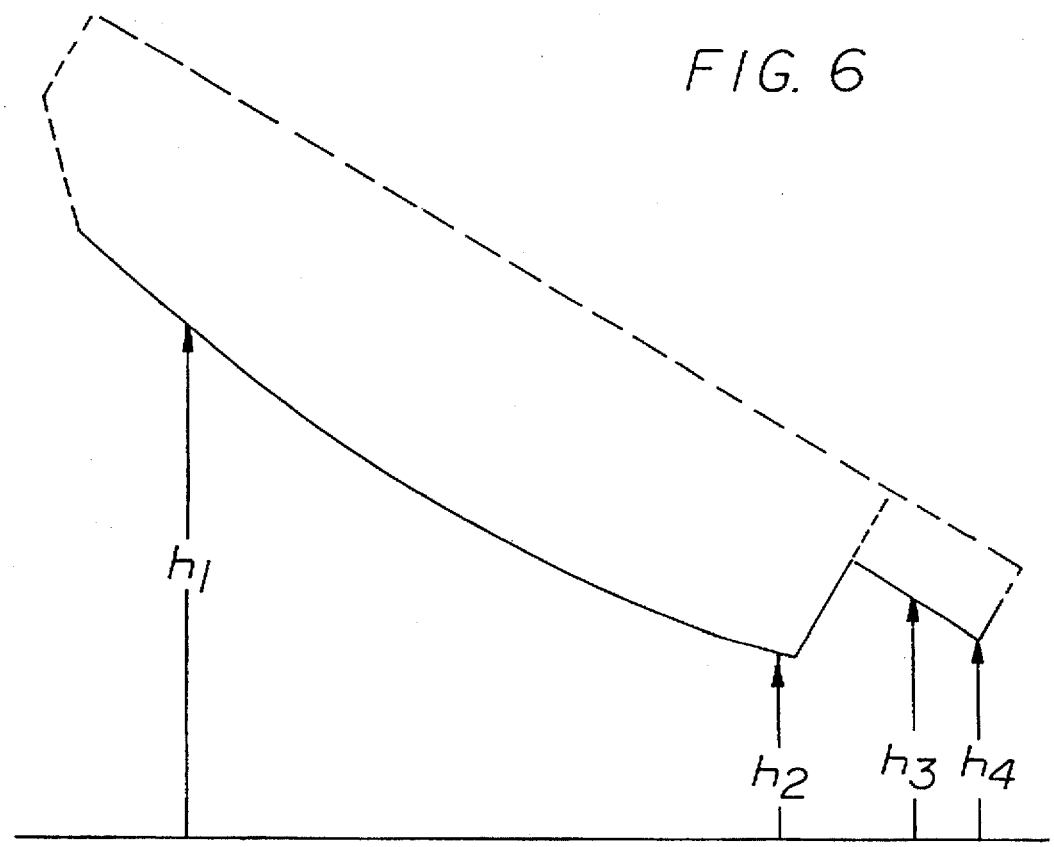
FIG. 6 is a schematic showing flying height measurements taken to verify the accuracy of the flying height tester.

It is desirable to verify the accuracy of the air bearing height measurements. The measurements can be verified by comparing measured values along different points of the recording head 14 with a height profile of the head 14. As shown in FIG. 6, four different air bearing heights $h_1$, $h_2$, $h_3$ and $h_4$ can be measured with the flying height tester 10. The heights $h_1$ and $h_2$ relate to the $Al_2O_3$—TiC substrate 36 and are assumed to be relatively accurate. The heights $h_2$, $h_3$ and $h_4$ may be $h_i$, $h_g$ and $h_m$, respectively.

Figure 7:
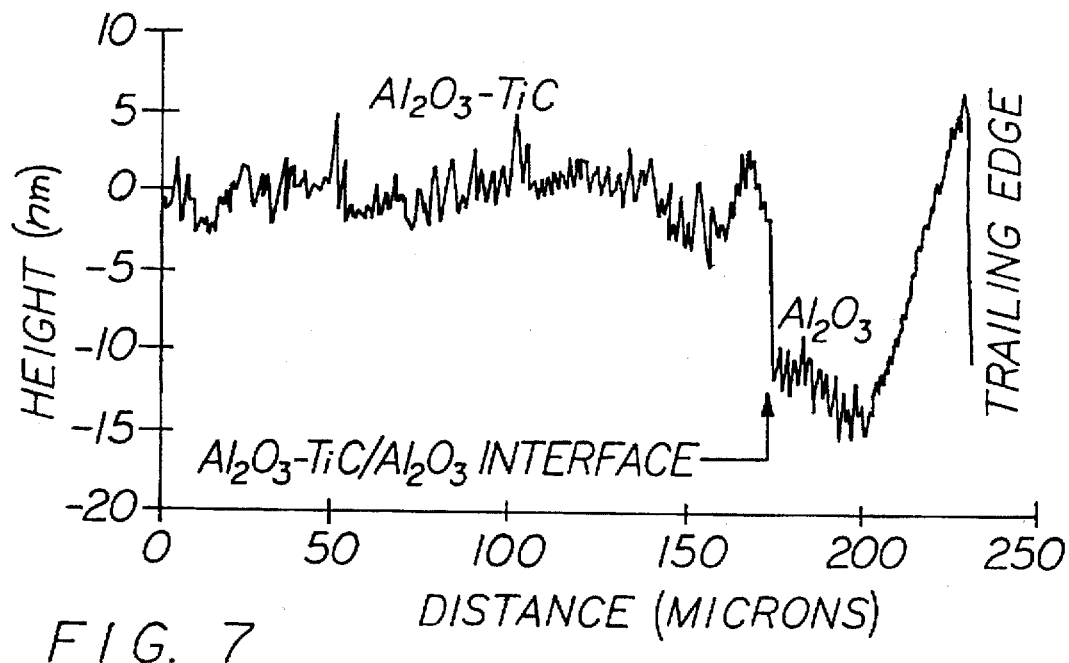
FIG. 7 is a graph showing the profile of the recording head as measured by a profilometer.
Figure 8:
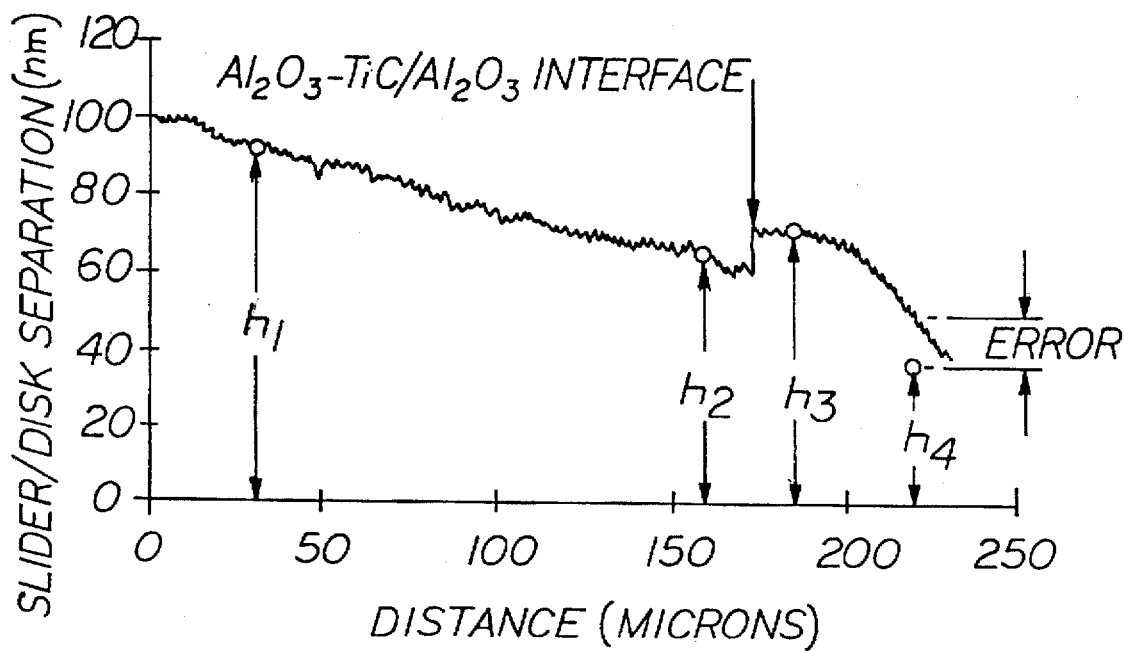
FIG. 8 is a graph which compares the measured values with the profile provided by the profilometer.

As shown in FIG. 7, a surface height profile is created for the air bearing surface of the head 14. The profile can be created with a profilometer, an atomic force microscope or any other means. As shown in FIG. 8, the profile data is inverted, rotated by the pitch angle $\Delta$ of the head, then increased so that a corresponding point of the profile is equal to $h_1$. The inverted, rotated profile data is then overlaid with the measured air bearing heights $h_1$, $h_2$, $h_3$ and $h_4$. The pitch angle can be computed from the measured heights $h_1$ and $h_2$.

The inverted, rotated profile data is overlaid so that the $h_1$ and $h_2$ values fall onto corresponding points on the profile. If the flying height tester is 100% accurate the measurements $h_3$ and $h_4$ should also fall on the profile data of the head. Any deviation between the values $h_3$ and $h_4$, and the corresponding profile data points will indicate an error in the tester.

The present invention thus provides a tester that can measure the true gap flying height and minimum flying height of a recording head, and verify the accuracy of the measurements.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method for measuring a height of an air bearing between a recording head and a rotating disk, wherein the recording head has a read/write element located within a trailing edge that extends from an interface of a head substrate, the trailing edge has an outer tip and an air bearing surface that is recessed from an air bearing surface of the head substrate, comprising the steps of:

a) rotating the disk so that the interface of the head substrate is separated from the disk by an air bearing height $h_i$, the read/write element is separated from the disk by an air bearing height $h_g$, and the trailing edge outer tip is separated from the disk by an air bearing height $h_m$; and, b) measuring the heights $h_i$, $h_g$ and $h_m$.

2. The method as recited in claim 1, wherein the heights are measured by directing a light beam through the disk and detecting the light beam reflected from the recording head.

3. The method as recited in claim 2, further comprising the steps of measuring an optical property of the head substrate and an optical property of the trailing edge and utilizing the optical properties to measure the heights $h_i$, $h_g$ and $h_m$.

4. The method as recited in claim 3, wherein the optical properties include an index of refraction n and a extinction coefficient k for the head substrate and the trailing edge.

5. The method as recited in claim 1, wherein the height $h_g$ is measured by measuring a height $h_g1$ and a height $h_g2$ located at opposite sides of the read/write element and calculating an average of $h_g1$ and $h_g2$.

6. The method as recited in claim 1, wherein the height $h_g$ is measured with a light beam that has a spot area that is at least 20 times an area of the read/write element.

7. The method as recited in claim 1, further comprising the steps of measuring a plurality of profile data of the head substrate and the trailing edge, inverting, rotating and increasing the profile data, measuring a plurality of air bearing heights and then comparing the measured air bearing heights with said inverted, rotated and increased profile data to determine an error.

8. The method as recited in claim 7, wherein the measured air bearing heights include points on the substrate and the trailing edge.

9. A method for measuring a height of an air bearing between a recording head and a rotating disk, wherein the recording head has a read/write element located within a trailing edge that extends from an interface of a head substrate, the trailing edge has an outer tip and an air bearing surface that is recessed from an air bearing surface of the head substrate, comprising the steps of:

a) measuring an index of refraction n and an extinction coefficient k for the head substrate and the trailing edge;

a) rotating the disk so that the interface of the head substrate is separated from the disk by an air bearing height $h_i$, the read/write element is separated from the disk by an air bearing height $h_g$, and the trailing edge outer tip is separated from the disk by an air bearing height $h_m$;

b) measuring the heights $h_i$, $h_g$ and $h_m$ using the index of refraction n and extinction coefficient k of the head substrate and trailing edge;

c) measuring a plurality of profile data of the head substrate and the trailing edge;

d) measuring an air bearing height $h_1$ on the recording head;

e) varying the profile data so that a corresponding point is equal to the height $h_1$; and, f) comparing the measured heights $h_g$ and $h_m$ with corresponding points of the varied profile data to determine an error.

10. The method as recited in claim 9, wherein the heights are measured by directing a light beam through the disk and detecting the light beam reflected from the recording head.

11. The method as recited in claim 10, wherein the height $h_g$ is measured by measuring a height $h_g1$ and a height $h_g2$ located at opposite sides of the read/write element and calculating an average of $h_g1$ and $h_g2$.

12. The method as recited in claim 10, wherein the height $h_g$ is measured with a beam that has a spot area that is at least 20 times an area of the read/write element.

13. A method for verifying a measured height of an air bearing of a recording head which has a read/write element located within a trailing edge that extends from an interface of a head substrate, the trailing edge has an outer tip and an air bearing surface that is recessed from an air bearing surface of the head substrate, wherein the head substrate is separated from a rotating disk by an air bearing height $h_i$, the read/write element is separated from the disk by an air bearing height $h_g$, and the trailing edge outer tip is separated from the disk by an air bearing height $h_m$, comprising the steps of:

a) measuring a profile of the head substrate and the trailing edge;

b) measuring an air bearing height $h_1$ on the recording head;

c) varying the profile data so that a corresponding point of the profile data is equal to the height $h_1$; and;

d) comparing the measured heights $h_g$ and $h_m$ with corresponding points of said varied profile data to determine an error.

14. The method as recited in claim 13, wherein said profile data is varied by inverting and rotating said measured profile data.

15. A system for measuring a height of an air bearing between a recording head and a rotating disk, wherein the recording head has a read/write element located within a trailing edge that extends from an interface of a head substrate, the trailing edge has an outer tip and an air bearing surface that is recessed from an air bearing surface of the head substrate, comprising:

a disk that rotates adjacent to the recording head such that the interface of the head substrate is separated from the disk by an air bearing height $h_i$, the read/write element is separated from the disk by an air bearing height hg, and the trailing edge outer tip is separated from the disk by an air bearing height $h_m$;

a light source that directs a light beam through the disk so that the light beam is reflected from the recording head;

a photodetector that detects the reflected light beam;

a mechanism that moves the light beam relative to the recording head so that the light beam is reflected from the interface of the head substrate, the read/write element, and the trailing edge outer tip; and, a computer which calculates the heights $h_i$, $h_g$ and $h_m$ from the reflected light beam.

16. The system as recited in claim 15, further comprising an ellipsometer that measures an optical property of the head substrate and an optical property of the trailing edge, wherein the optical properties are utilized to calculate the heights $h_i$, $h_g$ and $h_m$.

17. The system as recited in claim 15, wherein the optical properties include an index of refraction n and an extinction coefficient k for the head substrate and trailing edge.

18. The system as recited in claim 15, wherein the light beam is moved to locations at opposite sides of the read/write element to measure the height $h_g$.

19. The system as recited in claim 15, wherein the light beam that has a spot area that is at least 20 times an area of the read/write element.

20. The system as recited in claim 19, further comprising a profilometer that measures a plurality of profile data that are compared with the measured heights to determine an error.

* * * * *